(12) United States Patent
Hashimura et al.

(10) Patent No.: US 10,421,318 B2
(45) Date of Patent: Sep. 24, 2019

(54) PNEUMATIC TIRE AND PROCESS FOR PRODUCING THE SAME

(71) Applicant: THE YOKOHAMA RUBBER CO., LTD., Minato-ku, Tokyo (JP)

(72) Inventors: Yoshiaki Hashimura, Kanagawa (JP); Takumi Hatakeyama, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 481 days.

(21) Appl. No.: 14/987,925

(22) Filed: Jan. 5, 2016

(65) Prior Publication Data

US 2016/0107484 A1    Apr. 21, 2016

Related U.S. Application Data

(63) Continuation of application No. 12/864,996, filed as application No. PCT/JP2009/054309 on Mar. 6, 2009, now abandoned.

(30) Foreign Application Priority Data

Mar. 7, 2008  (JP) .................................. 2008-058770

(51) Int. Cl.
*B60C 5/14* (2006.01)
*B29D 30/30* (2006.01)
(Continued)

(52) U.S. Cl.
CPC ............ *B60C 5/14* (2013.01); *B29D 30/0681* (2013.01); *B29D 30/1621* (2013.01);
(Continued)

(58) Field of Classification Search
CPC ..... B60C 5/14; B60C 1/008; B60C 2005/145; B29D 30/1621; B29D 30/3021; B29D 2030/0682

See application file for complete search history.

(56) References Cited

U.S. PATENT DOCUMENTS 5,040,583 A    8/1991  Lin et al.
5,938,869 A    8/1999  Kaido et al.
(Continued)

FOREIGN PATENT DOCUMENTS

FR    2 299 978 A1    9/1976
JP    05-169909 A     7/1993
(Continued)

OTHER PUBLICATIONS

Machine translation of FR 2299978 A, patent document published Sep. 3, 1976.*

*Primary Examiner* — Geoffrey L Knable
(74) *Attorney, Agent, or Firm* — Carrier Blackman & Associates, P.C.; Joseph P. Carrier; Anne G. Sabourin

(57) ABSTRACT

A pneumatic tire includes film layers of thermoplastic resin or thermoplastic elastomer composition made by blending an elastomer with the thermoplastic resin, which are superposed by winding the film layer in the circumferential direction of the tire multiple times, a thickness of the film layer is in a range of 0.02 mm to 0.2 mm and a thickness of the rubber layer is in a range of 0.1 mm to 1.2 mm, and the tire wherein a rubber film is interposed between the film layers. The pneumatic tire is produced by preparing a laminated body in which the rubber layer is stuck to at least one surface of the film layer; interposing the rubber layer between the film layers by winding the laminated body in the circumferential direction of the tire multiple times; forming an uncured tire which includes the film layers and the rubber layers; and curing the tire.

6 Claims, 2 Drawing Sheets

(51) Int. Cl.
*B29D 30/16* (2006.01)
*B29D 30/06* (2006.01)
*B60C 1/00* (2006.01)

(52) U.S. Cl.
CPC ........ *B29D 30/3021* (2013.01); *B60C 1/0008* (2013.01); *B29D 2030/0682* (2013.01); *B60C 2005/145* (2013.01); *B60C 2005/147* (2013.01); *Y10T 152/10495* (2015.01)

(56) References Cited

U.S. PATENT DOCUMENTS

| | | | |
|---|---|---|---|
| 6,136,123 | A | 10/2000 | Kaido et al. |
| 2002/0153083 | A1 | 10/2002 | Takagi |
| 2004/0089388 | A1 | 5/2004 | Fujino et al. |
| 2004/0194862 | A1 | 10/2004 | Fukutomi et al. |
| 2010/0024941 | A1 | 2/2010 | Hara et al. |
| 2010/0319829 | A1* | 12/2010 | Hashimura ........ B29D 30/0681 152/510 |

FOREIGN PATENT DOCUMENTS

| | | |
|---|---|---|
| JP | 8-217923 A | 8/1996 |
| JP | 9-052502 A | 2/1997 |
| JP | 11-199713 A | 7/1999 |
| JP | 2000-272023 A | 10/2000 |

\* cited by examiner

PNEUMATIC TIRE AND PROCESS FOR PRODUCING THE SAME

CROSS-REFERENCE TO RELATED APPLICATIONS

This application is a continuation of U.S. application Ser. No. 12/864,996, filed 28 Jul. 2010, which is the US National Phase of PCT/JP2009/054309 filed 6 Mar. 2009, which claims priority under 35 USC § 119 based on Japanese patent application No. 2008-058770, filed on 7 Mar. 2008. The subject matter of each of these priority documents is incorporated by reference herein.

TECHNICAL FIELD

The present invention relates to a pneumatic tire which includes a film layer of a thermoplastic resin or a thermoplastic elastomer composition obtained by blending an elastomer with a thermoplastic resin, and to a process for producing the same. More specifically, the present invention relates to a pneumatic tire which is capable of retaining a satisfactory uniformity even though film layers are superposed by winding a film layer multiple times in a circumferential direction of the tire, and to a process for producing the same.

BACKGROUND ART

Recent years, proposals have been made on a pneumatic tire in which a film layer of a thermoplastic resin or a thermoplastic elastomer composition obtained by blending an elastomer with a thermoplastic resin is placed as an air-permeation preventive layer on an inner surface of the tire (see Patent Document 1 and Patent Document 2, for instance).

In a case where a pneumatic tire including such a film layer is required to have a high capability of preventing air permeation as a truck tire, a bus tire and a construction vehicle tire, film layers need to be superposed by winding the film layer in a circumferential direction of the tire multiple times (see Patent Document 3, for instance). This is because, if the capability of preventing air permeation is enhanced through making a single film layer thicker, the rigidity of the thicker film layer becomes too high, and a tire making process accordingly becomes difficult. In other words, the superposition of thin film layers allows each film layer to be kept flexible, and concurrently secures a desired capability of preventing air permeation for a pneumatic tire owing to the superposed film layers.

However, when film layers are superposed on one another by winding a film layer in the circumferential direction of a tire multiple times, an interlayer tacking force (bonding force) between the film layers tends to be uneven at different locations due to, for instance, air remaining between the film layers. In addition, when an external force large enough to displace film layers from each other works on the film layers, what is termed as a stick-slip phenomenon (frictional vibrations involving an alternate series of motions and stops due to an external force and a frictional force) tends to occur because the film layers are high in rigidity. For this reason, when the film layers are superposed by winding a film layer in the circumferential direction of the tire multiple times, it is difficult to expand an uncured tire evenly. Furthermore, in a case where the uncured tire is expanded unevenly due to the superposed film layers, the uneven expansion adversely affects the casing structure including a carcass layer and belt layers, and thus causes a problem of deteriorating the uniformity of the tire.

Patent Document 1: Japanese patent application Kokai publication No. Hei. 8-217923
Patent Document 2: Japanese patent application Kokai publication No. Hei. 11-199713
Patent Document 3: Japanese patent application Kokai publication No. Hei. 9-52502

DISCLOSURE OF THE INVENTION

Problem to be Solved by the Invention

An object of the present invention is to provide: a pneumatic tire which is capable of retaining a satisfactory uniformity even though film layers are superposed by winding a film layer in a circumferential direction of the tire multiple times, the film layer being made of a thermoplastic resin or a thermoplastic elastomer composition obtained by blending an elastomer with a thermoplastic resin; and a process for producing the same.

Means for Solving the Problem

A pneumatic tire of the present invention aiming to achieve the above-described object is a pneumatic tire which includes film layers superposed by winding a film layer in a circumferential direction of the tire a plurality of times, the film layer being made of any one of a thermoplastic resin and a thermoplastic elastomer composition obtained by blending an elastomer with a thermoplastic resin, characterized in that a rubber layer is interposed between the film layers.

Further, a process for producing the pneumatic tire of the present invention aiming to achieve the above-described object is a process for producing a pneumatic tire characterized by comprising: preparing a laminated body in which a rubber layer is stuck to at least one surface of a film layer made of any one of a thermoplastic resin and a thermoplastic elastomer composition obtained by blending an elastomer with a thermoplastic resin; interposing the rubber layer between the film layers by winding the laminated body in a circumferential direction of the tire a plurality times; forming an uncured tire which includes the film layers and the rubber layers; and curing the tire.

Effects of the Invention

In the present invention, when film layers of a thermoplastic resin or a thermoplastic elastomer composition are superposed on one another by winding a film layer in the circumferential direction of the tire multiple times, a rubber layer is interposed between the film layers. This makes a tacking force between the film layers uniform, and inhibits a stick-slip phenomenon from occurring between the film layers, thereby allowing an uncured tire to be expanded evenly. Accordingly, the pneumatic tire is capable of retaining a satisfactory uniformity even when the film layers which are superposed by winding the film layer in the circumferential direction of the tire multiple times.

It is desirable that the manufacturing of the pneumatic tire according to the present invention be achieved by: preparing a laminated body obtained by sticking a rubber layer to at least one surface of a film layer; interposing the rubber layer between the film layers by winding the laminated body in a circumferential direction of the tire multiple times; and forming an uncured tire which includes the film layers and the rubber layers. In this case, the rubber film can be easily inserted between the film layers.

In the present invention, the film layer can be used as one of the various component members of a tire. Nevertheless, it is desirable that the film layer should constitute an air-permeation preventive film placed closer to an inner-cavity of the tire than a carcass layer is. In this case, the tire can exhibit a satisfactory capability of preventing air permeation owing to the superposed film layers.

Figure 1:
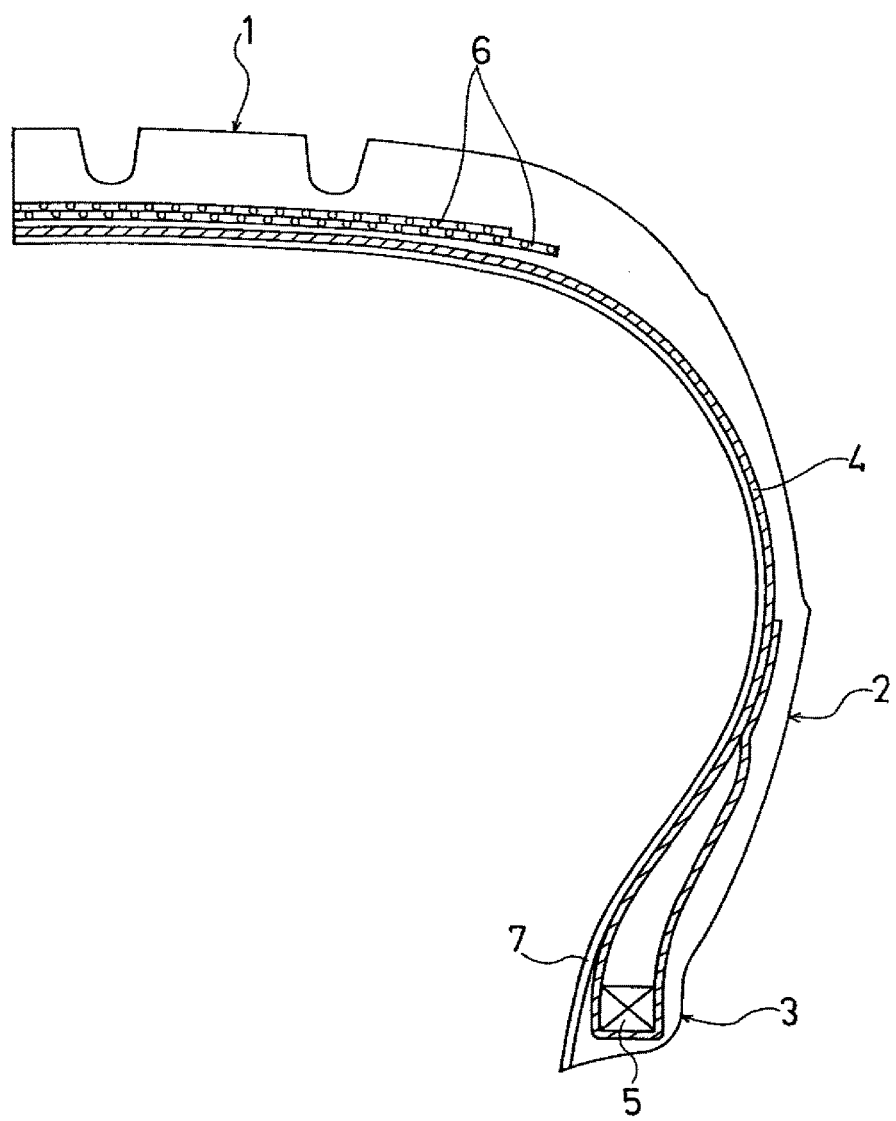
FIG. 1 is a meridian half cross-sectional view showing a pneumatic tire according to an embodiment of the present invention.

EXPLANATION OF REFERENCE NUMERALS 1 tread part
2 sidewall part
3 bead part
4 carcass layer
5 bead core
6 belt layer
7 air-permeation preventive layer
10 laminated body
11 film layer
12 rubber layer

BEST MODES FOR CARRYING OUT THE INVENTION

Figure 2:
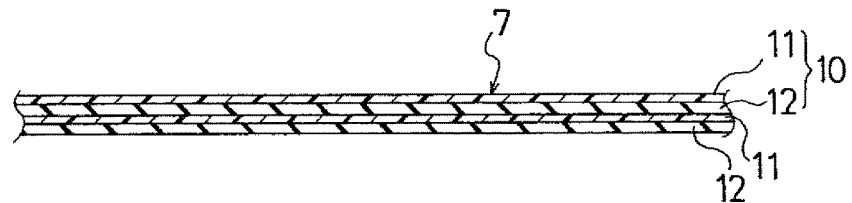
FIG. 2 is a magnified cross-sectional view showing an air-permeation preventive layer included in the pneumatic tire shown in FIG. 1.

Detailed descriptions will be hereinbelow provided for a configuration according to the present invention with reference to the attached drawings. FIG. 1 shows a pneumatic tire according to an embodiment of the present invention. FIG. 2 shows an air-permeation preventive layer included in the pneumatic tire. In FIG. 1, reference numeral 1 denotes a tread part; 2, a sidewall part; and 3, a bead part. A carcass layer 4 is laid between the paired left and right bead parts 3, 3. Each end portion of the carcass layer 4 is folded back from the inner side to the outer side of the tire around a bead core 5. Multiple belt layers 6 are buried in the tread part 1, which is situated at an outer peripheral side of the carcass layer 4. These belt layers 6 are placed there in a way that: a reinforcement cord of each belt layer 6 tilts from a circumferential direction of the tire; and the reinforcement cords of the respective belt layer 6 cross over each other.

In the pneumatic tire described above, an air-permeation preventive layer 7 is placed closer to an inner-cavity of the tire than the carcass layer 4 is. As shown in FIG. 2, the air-permeation preventive layer 7 has a structure in which film layers 11 of a thermoplastic resin or a thermoplastic elastomer composition are superposed by winding a film layer 11 in the circumferential direction of the tire multiple times. To put it more specifically, a laminated body 10 obtained by sticking a rubber layer 12 to one surface of the film layer 11 is wound in the circumferential direction of the tire multiple times. As a result, the air-permeation preventive layer 7 has a structure in which the rubber layer 12, the film layer 11, the rubber layer 12 and the film layer 11 are superposed on one another from the inner-cavity side of the tire. Thereby, the rubber layer 12 is interposed between the film layers 11 throughout the film layers 11.

The thickness of the film layer 11 may be selected from a range of 0.002 mm to 0.7 mm, although no specific restriction is imposed on the thickness of the film layer 11. On the other hand, it is desirable that the thickness of the rubber layer 12 should be 0.1 mm to 1.8 mm. When the rubber layer 12 is too thin, it is difficult to laminate the rubber layer 12 and the film layer 11 together. When the rubber layer 12 is too thick, the rubber layer 12 becomes heavier. A butyl rubber, a diene-based rubber, or the like may be used for the rubber layer 12, although no specific restriction is imposed on a rubber for the rubber layer 12.

The pneumatic tire having the foregoing configuration is obtained with the following scheme. The air-permeation preventive layer with the laminated structure in which the rubber layer 12 is interposed between the film layers 11 is formed by winding the laminated body 10, obtained by sticking the rubber layer 12 to one surface of the film layer 11, around a making drum multiple times. Subsequently, a primary green tire is formed by sticking the tire component members, inclusive of a carcass layer, a bead core, a bead filler and a sidewall rubber, onto the air-permeation preventive layer. Thereafter, a secondary green tire (uncured tire) is formed by sticking a belt layer and a tread rubber to the primary green tire while the primary green tire is expanded radially into a toroidal shape. Afterward, the secondary green tire is cured.

An interlayer tacking force between the film layers 11 can be made uniform, since the rubber layer 12 is interposed between the film layers 11 when the film layers 11 of the thermoplastic resin or a thermoplastic elastomer composition are superposed by winding the film layer 11 in the circumferential direction of the tire multiple times. In other words, when no rubber layer 12 is interposed between the film layers 11, the tacking force is not uniform due to influence of air remaining between the film layers 11. In contrast, when the rubber layer 12, which has a high adhesiveness when not vulcanized, is interposed between the film layers 11, the tacking force can be made uniform. Furthermore, when the rubber layer 12 is interposed between the film layers 11, the film layers 11 are less likely to displace from each other due to a stick-slip phenomenon. For this reason, even though the film layers 11 are superposed by winding the film layer 11 in the circumferential direction of the tire multiple times, the uncured tire can be expanded evenly during the tire making process. Accordingly, the cured tire is capable of retaining a satisfactory uniformity.

Figure 3:
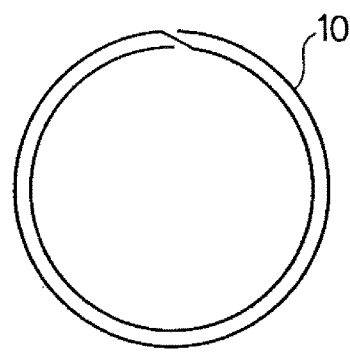
FIG. 3 is a schematic diagram showing a winding structure in which a laminated body including a film layer and a rubber layer is wound.
Figure 4:
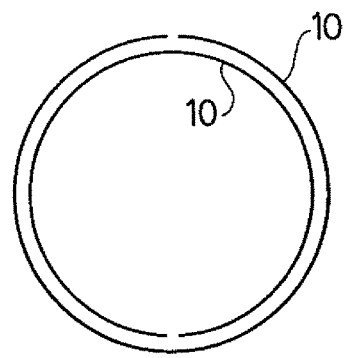
FIG. 4 is a schematic diagram showing another winding structure in which the laminated body including the film layer and the rubber layer is wound.

FIGS. 3 and 4 are schematic diagrams each showing a winding structure in which the laminated body including the film layer and the rubber layer is wound. Note that FIGS. 3 and 4 are the schematic diagrams each showing a cross section of the member placed around the making drum, which is taken along a plane orthogonal to an axis of the drum.

In FIG. 3, the laminated body 10 including the film layer 11 and the rubber layer 12 is continuously wound in the circumferential direction of the tire multiple times. Thereby, the rubber layer 12 is interposed between the film layers 11.

In FIG. 4, although the laminated body 10 including the film layer 11 and the rubber layer 12 is wound in the circumferential direction of the tire multiple times, each circle of the laminated body 10 is made using a discrete member. To put it more specifically, the laminated body 10 situated outward in a radius direction of the tire is wound in a way that the laminated body 10 covers a splice part of the laminated body 10 situated inward in the radial direction of the tire. Thereby, the rubber layer 12 is interposed between the film layers 11.

The foregoing embodiment has been described as a case in which: the laminated body 10 obtained by sticking the rubber layer 12 to one surface of the film layer 11 is used; and the laminated body 10 is arranged in a way that the rubber layer 12 is exposed to the inner surface of the tire. Instead, the laminated body 10 may be arranged in a way that the film layer 11 is exposed to the inner surface of the tire. Otherwise, a laminated body 10 obtained by sticking the rubber layer 12 to the both sides of the film layer 11 may be used.

Descriptions will be hereinbelow provided for the film layer which is used in the present invention. This film can be made of a thermoplastic resin or a thermoplastic elastomer composition which is obtained by blending an elastomer with a thermoplastic resin.

Examples of the thermoplastic resin used for the present invention include: polyamide resins [for instance, nylon 6 (N6), nylon 66 (N66), nylon 46 (N46), nylon 11 (N11), nylon 12 (N12), nylon 610 (N610), nylon (N612), a nylon 6/66 copolymer (N6/66), a nylon 6/66/610 copolymer (N6/66/610), nylon MXD6, nylon 6T, a nylon 6/6T copolymer, a nylon 66/PP copolymer, and a nylon 66/PPS copolymer]; polyester resins [for instance, aromatic polyesters such as polybutylene terephthalate (PBT), polyethylene terephthalate (PET), polyethylene isophthalate (PEI), a polybutylene terephthalate/tetramethylene glycol copolymer, a PET/PEI copolymer, polyarylate (PAR), polybutylene naphthalate (PBN), liquid-crystal polyester, and a polyoxyalkylene diimidic acid/polybutylene terephthalate copolymer]; polynitrile resins [for instance, polyacrylonitrile (PAN), polymethacrylonitrile, an acrylonitrile/styrene copolymer (AS), a methacrylonitrile/styrene copolymer, and a methacrylonitrile/styrene/butadiene copolymer]; poly(meta)acrylate resins [for instance, polymethylmethacrylate (PMMA), polyethylmethacrylate, an ethylene ethyl acrylate copolymer (EEA), an ethylene acrylic acid copolymer (EAA), and an ethylene methyl acrylate resin (EMA)]; polyvinyl resins [for instance, vinyl acetate (EVA), polyvinyl alcohol (PVA), a vinyl alcohol/ethylene copolymer (EVOH), polyvinylidene chloride (PVDC), polyvinyl chloride (PVC), a vinyl chloride/vinylidene chloride copolymer, and a vinylidene chloride/methyl acrylate copolymer]; cellulosic resins [for instance, cellulose acetate, and cellulose acetate butyrate]; fluororesins [for instance, polyvinylidene fluoride (PVDF), polyvinyl fluoride (PVF), polychlorofluoroethylene (PCTFE), and a tetrafluoroethylene/ethylene copolymer (ETFE)]; and imide resins [for instance, aromatic polyimide (PI)].

Examples of the elastomer to be used for the present invention include: diene-based rubbers and hydrogenated diene-based rubbers [for instance, NR, IR, epoxidized natural rubbers, SBR, butadiene rubbers (high cis BR and low cis BR), NBR, hydrogenated NBR and hydrogenated SBR]; olefin-based rubbers [for instance, ethylene propylene rubbers (EPDM, EPM), and a maleic-modified ethylene propylene rubber (M-EPM)]; a butyl rubber (IIR); a copolymer of an isobutylene and an aromatic vinyl monomer or a diene-based monomer; an acrylic rubber(ACM); an ionomer; halogen-containing rubbers [for instance, Br-IIR, Cl-IIR, a bromized isobutylene para-methyl styrene copolymer (Br-IPMS), chloroprene rubber (CR), hydrin rubbers (CHC, CHR), chlorosulfonated polyethylene (CSM), chlorinated polyethylene (CM), and maleic-modified chlorinated polyethylene (M-CM)]; silicone rubbers [for instance, a methyl vinyl silicone rubber, a dimethyl silicone rubber, and a methyl phenyl vinyl silicone rubber]; sulfur-containing rubbers (for instance, a polysulfide rubber); fluoro rubbers [for instance, a vinylidene fluoride-based rubber, a fluorine-containing vinyl ether-based rubber, a tetrafluoroethylene-propylene-based rubber, a fluorine-containing silicon-based rubber, a fluorine-containing phosphagen-based rubber]; and thermoplastic elastomers [for instance, a styrene-based elastomer, an olefin-based elastomer, a polyester-based elastomer, a urethane-based elastomer, and a polyamide-based elastomer].

In the thermoplastic elastomer composition to be used for the preset invention, the composition ratio between the thermoplastic resin component (A) and the elastomer component (B) may be determined with consideration being given to the balance between the thickness and the flexibility of the film layer depending on the necessity. It is preferable that the composition ratio should be determined within a range of 10/90 to 90/10 (in terms of ratio by weight). It is more preferable that the composition ratio should be determined within a range of 20/80 to 85/15 (in terms of ratio by weight).

As a third component in addition to the essential components (A) and (B), a different polymer, such as a compatibilizer, and a compounding ingredient may be mixed into the thermoplastic elastomer composition according to the present invention. Purposes of the mixture of a different polymer into the thermoplastic elastomer composition include, for example: the improvement of the compatibility between the thermoplastic resin component and the elastomer component; the improvement of the workability with which the material is molded into the film; the enhancement of the heat resistance of the material; and the cost reduction. Examples of the material to be used for the different polymer include polyethylene, polypropylene, polystyrene, ABS, SBS and polycarbonate.

The thermoplastic elastomer composition is obtained by beforehand melting and kneading the thermoplastic resin and the elastomer (unvulcanized elastomer when the elastomer is a rubber) by use of a biaxial kneader-extruder or the like, and thereby dispersing the elastomer component into the thermoplastic resin which forms a continuous phase. The vulcanization of the elastomer component may be achieved by dynamically vulcanizing the elastomer by adding a vulcanizing agent to the elastomer during the kneading process. In addition, compounding agents (except for the vulcanizing agent) for the thermoplastic resin or the elastomer component may be added to the thermoplastic resin or the elastomer component during the kneading process. Nevertheless, it is desirable that the compounding agents (except for the vulcanizing agent) should be added thereto before the kneading process. No specific restriction is imposed on the kneading machine used to knead the thermoplastic resin and the elastomer. Examples of the kneading machine include a screw kneader, a kneader, a Banbury mixer, and a biaxial kneader-extruder. It is desirable that, out of these machines, the biaxial kneader-extruder should be used to knead the resin component and the rubber component, as well as to dynamically knead the rubber component. Furthermore, the resin component and the rubber component may be kneaded by using two or more types of kneading machine sequentially. With regard to conditions for melting and kneading the resin component and the rubber component, it is desirable that: the temperature should be equal to or higher than a temperature at which the thermoplastic resin melts; the shear rate should be 2500 to 7500 sec$^{-1}$ during the kneading process; the total time needed for the kneading process should be 30 seconds to 10 minutes; and in a case where the vulcanizing agent is added thereto, the time needed for the vulcanizing process should be 15 seconds to 5 minutes after adding the vulcanizing agent thereto. The thermoplastic elastomer composition, which has been produced with the above-described method, is formed into a film by molding with the kneader-extruder, or by calendar molding. A usual method of forming a thermoplastic resin or a thermoplastic elastomer into a film may be used as the method of forming the thermoplastic elastomer composition, which has been produced with the above-described method, into a film.

A thin film of the thus-obtained thermoplastic elastomer composition has a structure in which, as a discontinuous phase, the elastomer is dispersed in the thermoplastic resin matrix. In the case where the thin film has the dispersion structure in this condition, the Young's modulus of the thin film can be set in a range of 1 to 500 MPa under the standard atmosphere specified by JIS K7100, and the thin film can be accordingly provided with rigidity suitable for a tire component member.

After the above-described thermoplastic resin or thermoplastic elastomer composition is formed into a sheet or film, the sheet or film may be buried in the inside of the tire as a single member. However, an adhesion layer may be attached to the sheet or film for enhancing the adhesion of the sheet or film to the adjacent rubber layer. Specific examples of the adhesive polymer, of which this adhesion layer is made, include: an ultra-high molecular weight polyethylene (UHMWPE) with a molecular weight of one million or more, preferably 3 million or more; acrylate copolymers and maleic anhydride adducts of acrylate copolymers such as an ethylene ethyl acrylate copolymer (EEA), an ethylene-methyl acrylate resin (EMA), and an ethylene-acrylic acid copolymer (EAA); polypropylene (PP) and maleic-modified polypropylene; an ethylene-propylene copolymer and a maleic-modified ethylene-propylene copolymer; a polybutadiene-based resin and maleic anhydride-modified ethylene polybutadiene-based resin; a styrene-butadiene-styrene copolymer (SBS); a styrene-ethylene-butadiene-styrene copolymer (SEBS); a fluoride-based thermoplastic resin; and a polyester-based thermoplastic resin. These adhesive polymers can be formed into a sheet or film in accordance with the conventional method, for instance, by use of a resin extruder. No specific restriction is imposed on the thickness of the adhesive film, but a thinner adhesive film is better from a viewpoint of reduction of the weight of the tire. It is desirable that the thickness of the adhesive film should be 5 mμ to 150 mμ.

The foregoing detailed descriptions have been provided for the preferred embodiment of the invention. It should be understood that various modifications, substitutions and replacements can be made for the embodiment as long as the modifications, substitutions and replacements do not deviate from the spirit or scope of the present invention which is defined by the attached scope of claims.

EXAMPLES

Pneumatic tires each with a tire size of 205/70R15 according to Conventional Example and Examples 1 to 2 were produced in a way that: the film layer of the thermoplastic elastomer composition obtained by blending the elastomer (bromized butyl rubber) with the thermoplastic resin (nylon 6, 66) is used in the air-permeation preventive layer of each pneumatic tire; and the structure of the air-permeation preventive layer is different among the pneumatic tires.

In the pneumatic tire according to Conventional Example, the air-permeation preventive layer is formed to include the film layers superposed by winding the film layer in the circumferential direction of the tire continuously twice. No rubber layer is interposed between the film layers in the pneumatic tire according to Conventional Example.

In the pneumatic tire according to Example 1, the air-permeation preventive layer is formed to include a laminated structure in which the rubber layer is interposed between the film layers by winding a single laminated body, in which the rubber layer is stuck to one surface of the film layer, in the circumferential direction of the tire continuously twice.

In the pneumatic tire according to Example 2, the air-permeation preventive layer is formed to include a laminated structure in which the rubber layer is interposed between the film layers by winding two discrete laminated bodies, in each of which the rubber layer is stuck to one surface of the film layer, in the circumferential direction of the tire once in a way that the splice portions of the respective discrete laminated bodies do not overlap each other.

For each of the test tires, the radial force variation (RFV) was measured in accordance with the uniformity test method for an automobile tire which is specified by JASO C607. The radial force variation of the test tire according to Conventional Example was indexed at 100, and the radial force variations of the respective test tires according to Examples 1 and 2 were indexed relative to that according to Conventional Example. The index value of the radial force variation of the test tire according to Example 1 was 92, and the index value of the radial force variation of the test tire according to Example 2 was 90. In sum, the tires according to Examples 1 and 2 were better in the uniformity than the tire according to Convention Example.

What is claimed is:

1. A pneumatic tire which includes film layers superposed by winding a film layer in a circumferential direction of the tire a plurality of times prior to curing and radially expanding the pneumatic tire into a toroidal shape, the film layer being made of any one of a thermoplastic resin and a thermoplastic elastomer composition obtained by blending an elastomer with a thermoplastic resin, wherein an uncured rubber layer is stuck to only one surface of the film layer to prepare a laminated body, the laminated body including the film layer is wound continuously in the circumferential direction of the tire the plurality of times such that the rubber layer of one winding of the laminated body is interposed between the film layer of the one winding and the film layer of an adjacent winding of the laminated body, and for each winding of the laminated body the film layer has the same composition and covers the same area of the tire, wherein a thickness of the film layer is in a range of 0.002 mm to 0.7 mm and a thickness of the rubber layer is in a range of 0.1 mm to 1.8 mm, and wherein the rubber layer of an innermost winding of the laminated body is exposed and faces toward an inner-cavity of the tire.

2. The pneumatic tire according to claim 1, wherein the film layers constitute an air-permeation preventive layer placed closer to the inner-cavity of the tire than a carcass layer of the tire is.

3. The pneumatic tire according to claim 1, further including an adhesion layer attached to the film layer which enhances adhesion of the film layer to the rubber layer.

4. A process for producing a pneumatic tire comprising the steps of:
 preparing a laminated body in which a rubber layer is stuck to only one surface of a film layer made of anyone of a thermoplastic resin and a thermoplastic elastomer composition obtained by blending an elastomer with a thermoplastic resin, wherein a thickness of the film layer is in a range of 0.002 mm to 0.7 mm and a thickness of the rubber layer is in a range of 0.1 mm to 1.8 mm;
 continuously winding the laminated body in a circumferential direction of the tire a plurality times so as to form an air permeation prevention layer including plural windings of the laminated body, and in which the rubber layer of one winding of the laminated body is interposed between the film layer of the one winding and the film layer of an adjacent winding of the laminated body, and in which for each winding of the laminated body the film layer has the same composition and covers the same area of the tire;
 forming an uncured tire which includes the plural windings of the laminated body and wherein the rubber layer of an innermost winding of the laminated body is exposed and faces toward an inner-cavity of the tire; and
 curing the tire.

5. The process for producing a pneumatic tire according to claim 4, wherein the air-permeation preventive layer is placed closer to the inner-cavity of the tire than a carcass layer of the tire is.

6. The process for producing a pneumatic tire according to claim 4, further including the step of attaching an adhesion layer to the film layer to enhance adhesion of the film layer to the rubber layer.

* * * * *